United States Patent [19]

Magalhaes

[11] 4,256,266

[45] Mar. 17, 1981

[54] PROCESS TO OBTAIN ANATHASE CONCENTRATES FROM AN ANATHASE ORE

[76] Inventor: Gustavo Magalhaes, rua Professor Almeida Cunha No. 196, Belo Horizonte Minas Gerais, Brazil

[21] Appl. No.: 971,266

[22] Filed: Dec. 20, 1978

[30] Foreign Application Priority Data

Jan. 31, 1978 [BR] Brazil ................................. 7800585

[51] Int. Cl.$^3$ ............................................. B02C 23/20
[52] U.S. Cl. ...................................... 241/20; 241/29; 209/3; 209/12; 75/1 T
[58] Field of Search ............... 209/3, 39, 214, 8, 11 P, 209/127 NP, 12; 423/80, 157, 152; 75/1 TC; 241/20, 24

[56] References Cited

U.S. PATENT DOCUMENTS

| | | | |
|---|---|---|---|
| 1,760,992 | 6/1930 | Palmer | 423/80 X |
| 1,999,825 | 4/1935 | Saklatwalla | 209/214 X |
| 2,154,682 | 4/1939 | Johnson | 209/3 |
| 2,180,804 | 11/1939 | Fahrenwald | 209/127 A |
| 2,240,718 | 5/1941 | Schiffman | 209/214 X |
| 2,441,594 | 5/1948 | Ramseyer | 423/152 |
| 2,765,074 | 10/1956 | Diamond | 209/214 X |
| 2,792,940 | 5/1957 | Baarson | 209/166 |
| 3,032,190 | 5/1962 | Le Baron | 209/214 X |
| 3,295,924 | 1/1967 | Colombo | 209/8 X |
| 4,115,256 | 9/1978 | de Zeeuw | 209/3 |

*Primary Examiner*—Robert Halper
*Attorney, Agent, or Firm*—Emory L. Groff, Jr.

[57] ABSTRACT

Process of obtaining an anathase concentrate from an anathase ore comprehends the reduction of the anathase ore to dimensions inferior to 125 mm; disaggregation in water; classification of the suspension and elimination of slimes and silicates; grinding of the deslimed fraction and low intensity magnetic separation; grinding of the non-magnetic fraction to a value inferior to 32 mesh; calcining and slight reduction to turn the limonite and the hematite into magnetite and elimination of the magnetite in low intensity magnetic separator; and electrostatic separation of the non-magnetic fraction to obtain, as conductor, a final product which is rich in anathase and has a low grade of impurities.

1 Claim, No Drawings

PROCESS TO OBTAIN ANATHASE CONCENTRATES FROM AN ANATHASE ORE

This invention describes a process to obtain anathase mechanical concentrates.

As it is known to the experts in this field, titanium is one of the most abundant elements in the earth's curst; occurring in two mineral forms which are commercially exploitable: ilmenite and rutile. In the first case, titanium appears as an iron titanate with the formula $FeTiO_3$. In the second case, it appears as a dioxide, $TiO_2$.

Theoretically, there is a content of 56.6% of $TiO_2$ in the ilmenite. The presence of impurities and of larger amounts of bivalent iron in the ore cause this value to oscilate between 40 and 60% in the commercial products. This value exceeds 95% in the rutile.

The ilmenite, which is more abundant and has lower prices, has been the main raw material used in the transformation industries, especially for the production of pigments of titanium dioxide which uses the sulfate process. Rutile, which is scarcer and has higher prices, is used in the industry for production of titanium tetrachloride, $TiCl_4$, from which originate pigments of $TiO_2$ and metallic titanium, besides other chlorides used as catalysers.

In view of the low grade of $TiO_2$ contained in ilmenite as compared with rutile, the use of ilmenite in transformation industries produces large amounts of aggressive effluent substances, the elimination of which is progressively more expensive due to the anti-pollution laws which have been created in order to protect the environment.

Due to these legal requirements, a great tendency to replace ilmenite by rutile has been observed. Rutile, however, does not respond to the "sulfate" technology for the production of pigment, which has gradually been replaced by the "chlorine" technology.

The scarcity of rutile besides its increasing demand has led to the development of processes aimed at obtaining concentrates with the physical and chemical characteristics of rutile, originating from ilmenite, the deposits of which are abundant. However, all these processes if they are not expensive, they would simply transfer the pollution from the pigment industries to processing plants.

The recent discoveries of alkaline chimneys of titanium ore have created new perspectives for industries of pigments and other titanium products. In these occurences titanium appears as anathase, a mineral which was only academically known until recently. Anathase is a titanium dioxide, $TiO_2$, which appears highly impurified, especially by limonite, magnetite and phosphates in alkaline chimneys.

The research on the good utilization of anathase ore, aiming at its use in the chlorine process are directed to obtain a concentrate which would not only satisfy the chemical composition requirements (presence of harmful impurities) but also the grain size characteristics required for its use in fluidized bed, the only process proved economical for titanium ore chlorination.

This invention, using the juxtaposition of known unit operations, make it possible to obtain a new raw material as a resulting product, which would present lower prices than and identical qualities to those of rutile, which is becoming increasingly scarcer in the world. As a whole, it is an inedited process which uses operations never before used to obtain anathase concentrate applicable to the chlorine process in order to obtain pigments and metallic titanium.

In the only FIGURE in the enclosed drawing a flowsheet is shown where an example of the processing to obtain anathase mechanical concentrates according to this invention is exposed.

The process to obtain anathase mechanical concentrates according to this invention can be described as follows:

The anathase ore containing about 25 to 30% of $TiO_2$ is reduced to dimensions inferior to 125 mm and is then disaggregated in water, in a rotating drum. The material, in an aqueous suspension, is classified in a spiral classifier, resulting in an over-flow with about 30% of solids, from which slimes and silicates are eliminated.

The deslimed fraction is ground to sizes under 3 mm and then undergoes low intensity magnetic separation.

The non-magnetic fraction is ground under 32 mesh, avoiding as far as possible the production os fines inferior to 200 mesh.

The ground material then undergoes a process of calcination followed by slight reduction, aiming at turning the limonite and the hematite present in the ore into magnetite, which is eliminated in low intensity magnetic separator.

The non-magnetic fraction then undergoes an electrostatic separation under various tensions so that, as conductor a final product, which is rich in anathase and has a low content of impurities, is obtained.

The stages of the process as well as its percentual parts can be easily understood in the flowsheet of the enclosed drawing.

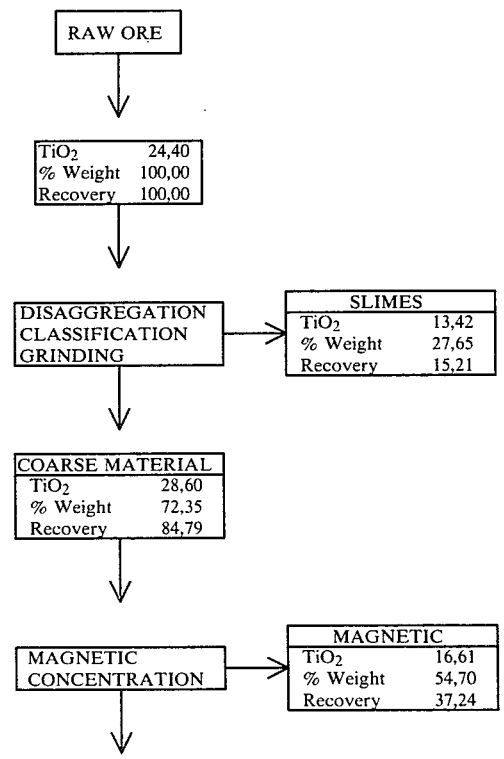

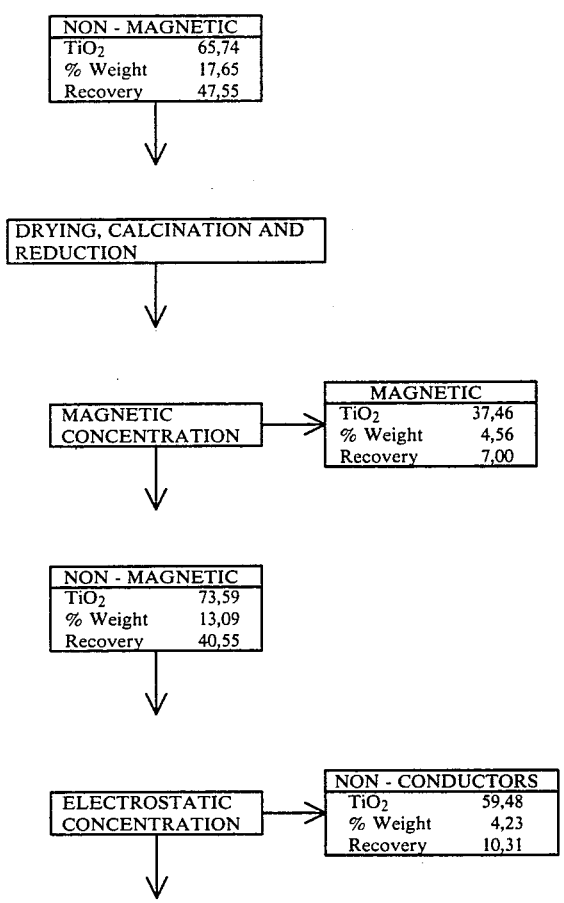

| CONDUCTORS | |
|---|---|
| $TiO_2$ | 83,28 |
| % Weight | 8,86 |
| Recovery | 30,24 |

I claim:

1. A process for treating raw anathase ore to obtain an anathase concentrate containing a reduced content of non-titanium impurities suitable for utilization in the chlorine process for producing high grade titanium compound pigments and metallic titanium consisting essentially of the steps of:

(a) grinding the raw anathase ore to particles having a diameter less than 125 mm;

(b) disaggregating the ground ore in water;

(c) classifying the disaggregated ore in aqueous suspension to produce a de-slimed, coarse fraction and a slimes fraction;

(d) grinding the de-slimed, coarse fraction to particles having a diameter less than 3 mm;

(e) subjecting the ground fraction to low intensity magnetic separation to produce a magnetic and a non-magnetic fraction;

(f) grinding the non-magnetic fraction to particles having an average size between 32 mesh and 200 mesh;

(g) drying and calcining the ground, non-magnetic fraction under conditions such that the limonite and hematite content thereof are converted and reduced to magnetite;

(h) subjecting the calcined fraction to low intensity magnetic separation to remove said magnetite;

(i) subjecting the said calcined fraction from which magnetite has been removed to electrostatic separation to yield a conductive fraction rich in anathase and low in non-titanium impurity content.

* * * * *